United States Patent [19]

Cross et al.

[11] Patent Number: 6,010,286
[45] Date of Patent: Jan. 4, 2000

[54] APPARATUS FOR RIGIDLY RETAINING CARGO

[75] Inventors: Michael Cross, Greensboro, N.C.; Jerry C. Dunlap, Santa Monica, Calif.; Steven E. Easley, Carson, Calif.; Donald N. Hagstrom, Cerritos, Calif.; Harry W. Slusher, Fountain Valley, Calif.; Jerry D. Smets, Orange, Calif.; L. Frank Sternat, Rancho Palos Verdes, Calif.; Tobie Stockwell, Long Beach, Calif.

[73] Assignee: McDonald Douglas Corporation, Hazelwood, Mo.

[21] Appl. No.: 08/816,701

[22] Filed: Mar. 13, 1997

[51] Int. Cl.⁷ .................................................. B60P 7/14
[52] U.S. Cl. ................. 410/129; 410/127; 244/118.1; 244/121
[58] Field of Search ................... 410/121, 127, 410/128, 129, 140; 244/118.1, 118.2, 120, 121; 220/529; 52/243

[56] References Cited

U.S. PATENT DOCUMENTS

| | | |
|---|---|---|
| 659,350 | 10/1900 | Osborn .................................. 52/243 X |
| 2,565,997 | 8/1951 | Stove ....................................... 410/129 |
| 2,669,402 | 2/1954 | Del Mar . |
| 3,025,804 | 3/1962 | Bruning .................................. 410/129 |
| 4,780,034 | 10/1988 | Skotte ..................................... 410/129 |
| 4,957,250 | 9/1990 | Hararat-Tehrani . |
| 5,085,382 | 2/1992 | Finkenbeiner . |
| 5,201,481 | 4/1993 | Hararat-Tehrani . |
| 5,217,184 | 6/1993 | Hararat-Tehrani . |
| 5,273,806 | 12/1993 | Lockshaw et al. ..................... 428/167 |
| 5,520,357 | 5/1996 | Payne et al. ........................ 410/105 X |
| 5,540,402 | 7/1996 | Carducci . |

FOREIGN PATENT DOCUMENTS

| | | |
|---|---|---|
| 354403A | 2/1990 | European Pat. Off. . |
| 2913050 A1 | 10/1980 | Germany . |
| 4141573A1 | 6/1993 | Germany ............................. 244/118.1 |

*Primary Examiner*—Stephen T. Gordon
*Attorney, Agent, or Firm*—Brooks & Kushman P.C.

[57] ABSTRACT

A rigid cargo barrier for a cargo airplane includes a lightweight structural bulkhead that is attached to the floor and fuselage shell of the aircraft and a plurality of compact attachments that connect the bulkhead to the floor and fuselage shell of the aircraft. The rigid cargo barrier also includes a restraint system that connects the bulkhead to the aircraft floor and fuselage shell. The restraint system restrains fuselage expansion under crash loads to maintain the bulkhead in place during a crash event and, hence, provide protection to the crew from shifting cargo.

9 Claims, 3 Drawing Sheets

APPARATUS FOR RIGIDLY RETAINING CARGO

TECHNICAL FIELD

The present invention relates to a rigid cargo barrier installation for an aircraft, and more particularly to a rigid cargo barrier installation for a cargo airplane that is safer, more durable, and requires less unusable space.

BACKGROUND ART

Apparatus for retaining cargo in cargo carrying airplanes are well known in the art. Currently, the apparatus utilized in almost all cargo carrying airplanes consists of a cargo barrier net. These cargo nets are installed just forward of the cargo to protect the aircraft crew from being crushed by the cargo in the event of a crash. Because the net is flexible and will stretch if subjected to force from cargo crashing against it, an area—typically about sixty (60) inches—forward of net must be left empty (net stretch space). This net stretch space cannot be used for crew, passengers, or equipment because they would be hit by cargo crashing into and stretching the net.

More recently, rigid or solid cargo barriers have been developed and installed. These rigid cargo barriers have consisted of a structural bulkhead forward of the cargo, instead of the flexible net. Like the prior cargo nets, the cargo barrier is attached to the floor and the fuselage shell of the aircraft. The rigid cargo barrier significantly reduces the deflection experienced during an accident, allowing the previously wasted net stretch space to be used. The rigid barriers, however, require large complex and expensive support or restraint systems to support the rigid barrier on the aircraft floor and fuselage.

For example, the Federal Aviation Authority (FAA) requires that cargo barriers, whether a cargo net or a rigid barrier, be designed to withstand the total weight of the aircraft's cargo multiplied by nine times the force of gravity (9 g's). Thus, the attachments between the net or barrier and the aircraft floor and fuselage shell must be capable of distributing this huge load into the aircraft's basic structure. Existing rigid cargo barrier installations require complex systems of tension rods and/or straps extending back into the cargo compartment, in the same manner that current cargo barrier nets are installed.

DISCLOSURE OF INVENTION

It is an object of the present invention to provide a rigid cargo barrier installation that is more cost effective than prior cargo barrier installations as well as more crashworthy.

The present invention has all of the primary attachments of the rigid barrier to the aircraft located forward of the cargo to thereby minimize possible damage thereto from either cargo or personnel.

The rigid cargo barrier installation includes a lightweight structural bulkhead that is attached to the cargo aircraft floor and/or the fuselage shell, forward of the cargo. The bulkhead substantially extends from the aircraft floor to the top of the fuselage and from one side of the aircraft to the other. The barrier includes a plurality of attachments to secure the barrier to the aircraft floor and the fuselage shell. The attachments are located forward of the barrier to minimize the possibility of damage to the attachments during normal cargo handling or in the event of a crash. The bulkhead also includes a restraint system that secures the bulkhead to the aircraft floor and fuselage shell, forward of the barrier. This will help keep the barrier in place, and provide additional protection to the crew. The plurality of attachments are compact and maximize the useful space in the area forward of the barrier or allow the barrier to be placed further forward in the cargo hold than prior cargo nets, maximizing the available cargo space.

The rigid cargo barrier may be attached to the cargo airplane floor and fuselage by providing a rigid bulkhead that substantially extends generally vertically between the floor of the aircraft and its fuselage. The bulkhead also substantially extends generally horizontally between the two sides of the fuselage. The bulkhead is then located within the cargo airplane forward of the cargo, being placed within the plane, the bulkhead is secured to the aircraft floor forward of the bulkhead with respect to the nose of the plane. A plurality of fittings are provided on the bulkhead for contacting a respective one of plurality of stops provided on the fuselage shell. The bulkhead is then secured to the fuselage such that the plurality of stops contact the respective plurality of fittings to prevent forward movement of the bulkhead.

While an embodiment of this invention is illustrated and disclosed, this embodiment should not be construed to limit the claims. It is anticipated that various modifications and alternative designs may be made without departing from the scope of this invention.

DETAILED DESCRIPTION OF THE INVENTION

Figure 1:
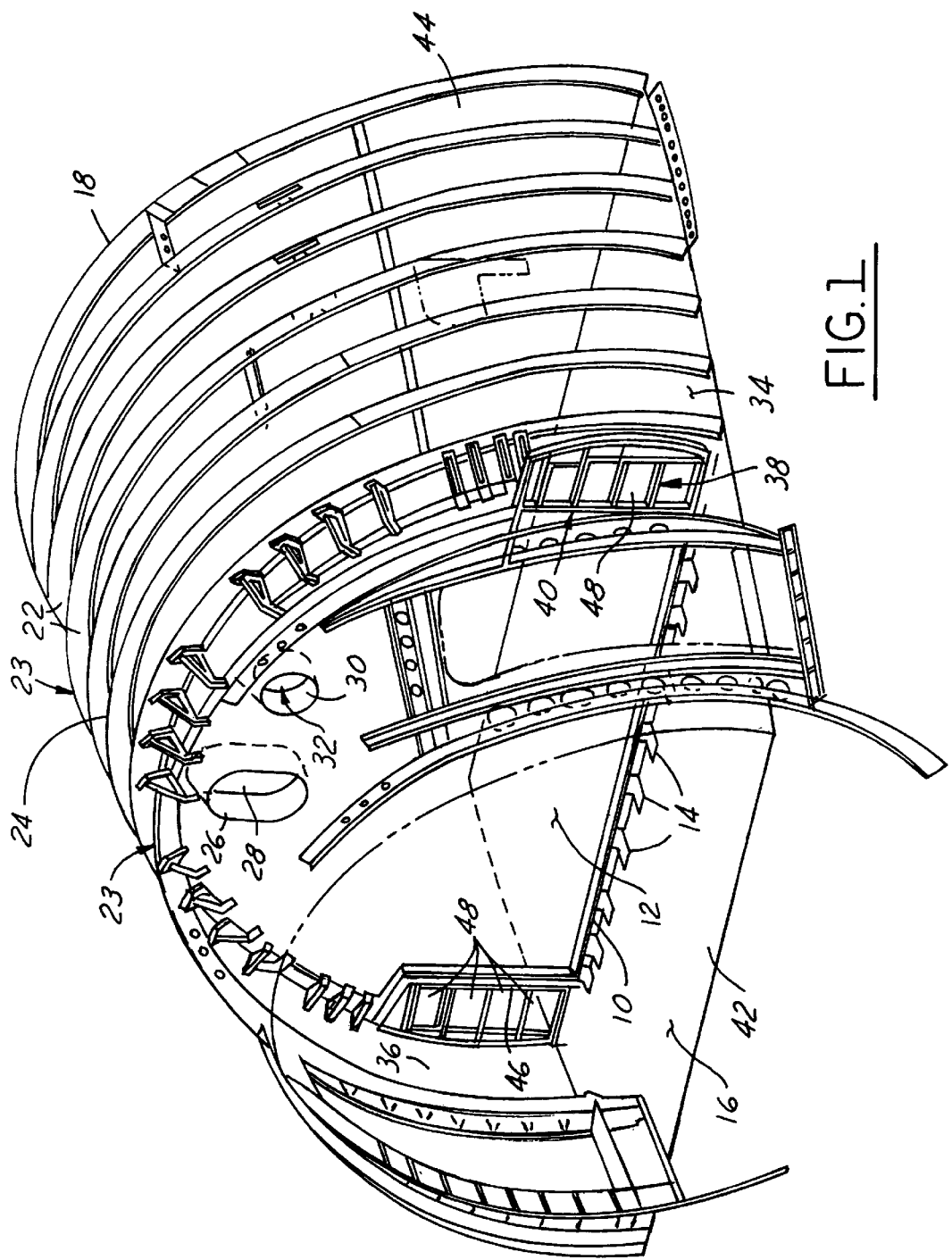
FIG. 1 is a perspective view broken away of the fuselage shell of an aircraft with a rigid cargo barrier therein in accordance with the present invention.

FIG. 1 generally illustrates a rigid cargo barrier 10 in accordance with the present invention. The rigid cargo barrier 10 includes a structural bulkhead 12, supported by a plurality of footings 14 (FIGS. 5 and 6) to attach it to the floor 16 of the aircraft 18. An attachment system 20 is also included to secure the bulkhead 12 to the fuselage shell 22 (FIG. 7).

Figure 7:
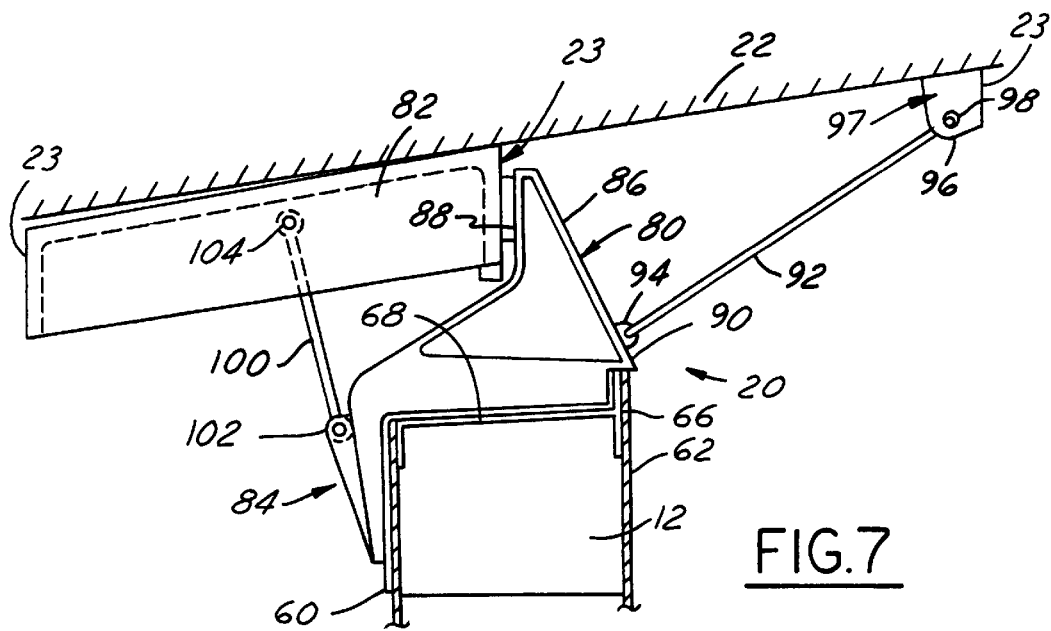
FIG. 7 is an edge view of a portion of the rigid cargo barrier installation illustrating the attachment of the barrier to the aircraft fuselage in accordance with the present invention.

In one embodiment, the bulkhead 12 is approximately 10 inches thick and straddles a fuselage frame 23 (FIGS. 1 and 7). However, the bulkhead 12 may be constructed of a variety of thicknesses and the thickness disclosed here should not be construed in any way as limiting the scope of the present invention. The bulkhead 12 is preferably of Grid-Lock type construction. Examples of the Grid-Lock type construction are disclosed in U.S. Pat. Nos. 5,273,806, 5,487,930, and 5,806,620. However, the bulkhead may also be of Honeycomb Sandwich type construction or other construction that would still provide the required strength and achieve the objects of the present invention. Additionally, the barrier may be fire retardant and provides a smoke and environmental barrier between the cargo and the crew. The barrier may also be made from suitable materials and constructed so as to act as a moisture barrier between the cargo hold and the crew compartment at floor level.

Figure 2:
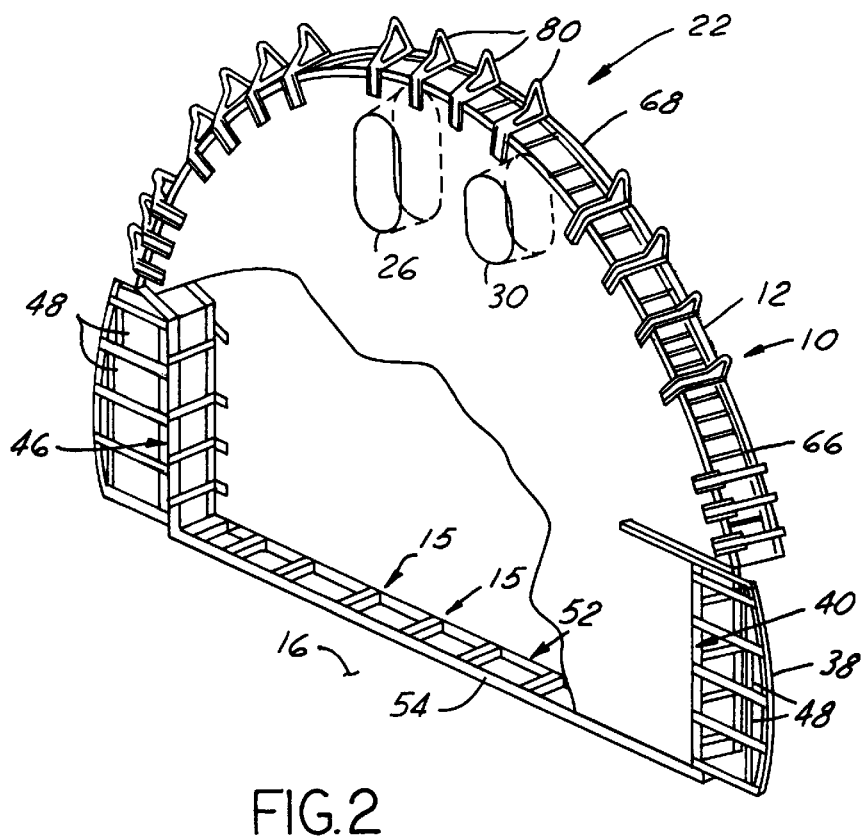
FIG. 2 is a perspective view, partially broken away, of the bulkhead of the rigid cargo barrier installation in accordance with the present invention.
Figure 3:
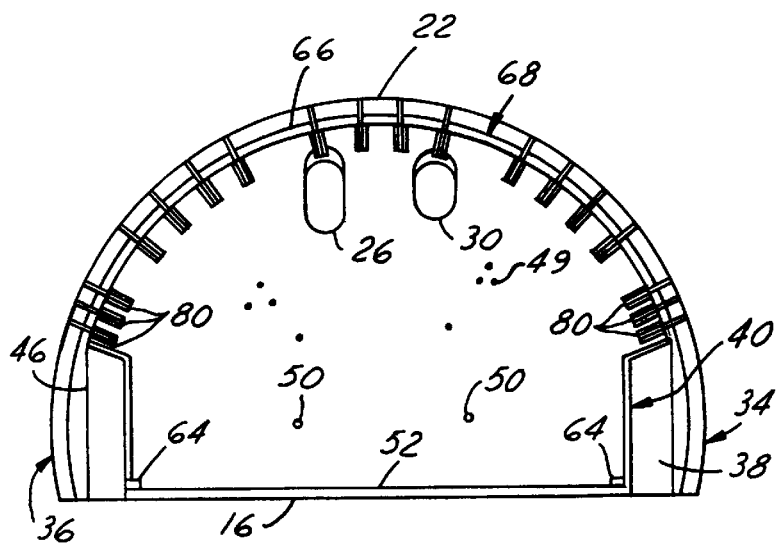
FIG. 3 is a front plan view of the bulkhead of the rigid cargo barrier installation of FIG. 2.
Figure 4:
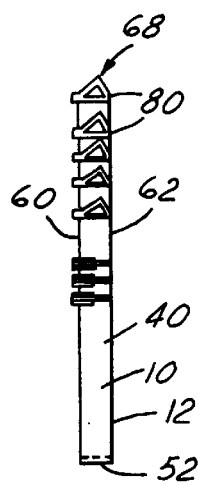
FIG. 4 is an edge view of the bulkhead of the rigid cargo barrier installation of FIG. 2.

Referring now to FIGS. 2 through 4, FIGS. 2 and 3 illustrate the forward face or "front side" of the rigid barrier 10 when the rigid barrier 10 is installed with the aircraft 18. However, it should be understood that these Figures are illustrative only and the configuration and locations of items on the barrier 10 can be varied. In the embodiment shown, the bulkhead 12 extends substantially from the floor 16 of the aircraft 18 to the top 24 of the interior space defined within the fuselage shell 22. As shown in FIG. 2, the bulkhead 12 includes a first opening 26 formed therethrough to accommodate the existing aircraft cargo air-conditioning duct 28. A second opening 30 may also be formed through the bulkhead 12 to accommodate a live animal transport air conditioning duct 32.

The bulkhead 12 also preferably extends substantially between the two side walls 34 and 36 of the aircraft 18. This ensures that there are no openings through which cargo can pass.

A sliding access door 38 is provided and in the embodiment shown, is located in an opening 40 formed on one lateral edge of the bulkhead 12. The access door 38 allows the crew to pass from the front 42 of the aircraft to the cargo compartment 44, either during flight or while the aircraft is on the ground. The access door 38 also accommodates a plurality of decompression vents 48.

The bulkhead 12 in this embodiment also has an opening 46 formed on the other lateral edge to accommodate a plurality of decompression vents 48. Both openings 40 and 46 are preferably protected by nets (not shown) to prevent cargo from passing through either opening 40 or 46 and injuring the crew during a crash. Such nets are known in the art and need not be discussed in further detail here.

As shown, the bulkhead 12 may incorporate at least one wire feedthrough 49 to allow wires to pass through the bulkhead 12. The bulkhead 12 may also incorporate one or more threaded or through inserts 50 for lifting lugs and tools to aid in installation of the rigid cargo barrier 10. In yet another embodiment (not shown), the bulkhead 12 incorporates a plurality of inserts that allow attachment of brackets to support the ceiling and electrical panels.

Figure 5:
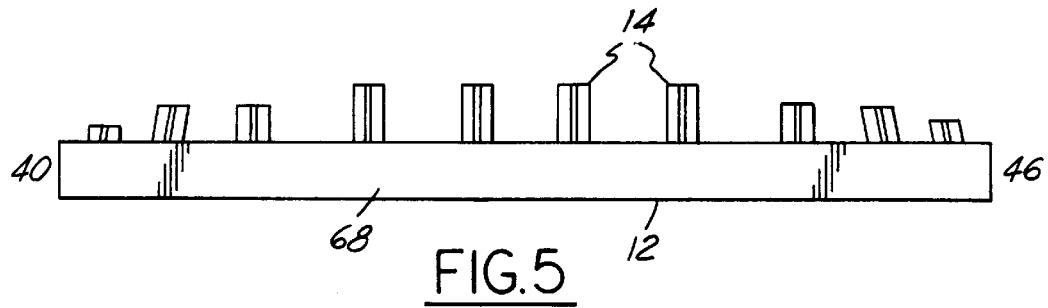
FIG. 5 is a top plan view of the rigid cargo barrier installation of FIG. 2 illustrating the attachment of the barrier to the aircraft floor.
Figure 6:
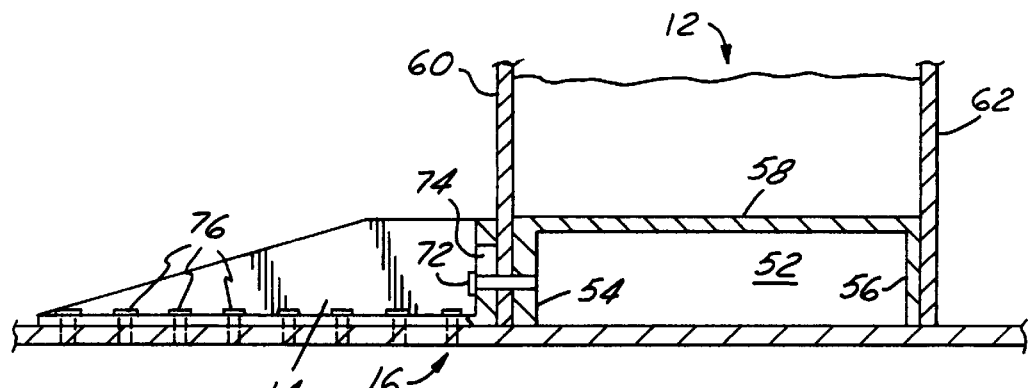
FIG. 6 is an edge view of a portion of the rigid cargo barrier installation illustrating the attachment of the barrier to the aircraft floor in accordance with the present invention.

As shown in FIGS. 2 through 4, the bulkhead 12 may include a generally hollow lower closeout channel 52 at its base. The lower closeout channel 52 (FIG. 6) is defined by a first side 54, a second side 56, and an upper surface 58. The lower closeout channel 52 extends transversely across the aircraft floor 16 between the first opening 40 and the second opening 46 (FIG. 5). In FIG. 6, the first side 54 of the lower closeout channel 52 is attached to the inner side of the front side 60 of the bulkhead 12. The second side 56 of the lower closeout channel 52 is attached to the inner side of the rear side 62 of the bulkhead 12. A pair of corner fittings 64 may also be included at the corner where the lower closeout channel 52 connects to the openings 40 and 46. An upper closeout channel 66 is also included along the arcuate top section 68 of the bulkhead 12. The upper closeout channel 66 provides a similar function as that described above for the lower closeout channel 52.

FIGS. 2 and 6 illustrate a plurality of ribs 15 that are integrally machined into the lower closeout channel 52 at the base of the bulkhead 12. A plurality of forward stop fittings 14 are attached to the front side 60 of the bulkhead 12 to secure the bulkhead 12 to the aircraft floor panel 16. The stop fittings 14 also, as explained in more detail below, deflect the loads from the cargo crashing against the barrier and provide strength for the rigid cargo barrier assembly 10. In the embodiment shown, ten forward stop fittings 14 are incorporated at locations along the floor. As shown in FIG. 5, the forward stop fittings 14 are preferably not all of equal length. The fittings 14 increase in length the closer to the center of the bulkhead 12 they are located. This is to better disperse the load to the floor panel 16. However, more or less forward stop fittings 14 may be used to secure the rigid cargo barrier 10 and their length may be varied depending upon the other characteristics of the assembly 10.

As shown in FIG. 6, one forward stop fitting 14 is shown. Each forward stop fitting 14 is secured to the bulkhead 12 via a pair of fasteners 72. It is to be understood that any conventional fasteners may be used.

The forward stop fittings 14 are designed to react to aft decompression and inertia loads in order to distribute loads to the aircraft floor 16, as discussed below. The forward stop fittings 14 include a pair of slotted holes 74 to allow for normal floor deflections due to cabin pressure and cargo loading. The slotted holes 74 will bottom out to keep the bulkhead 12 in contact with the forward stop fittings 14 in the event of higher floor deflections due to pressure from compressible cargo. The fasteners 72, pass through the slotted holes 74 in the forward stop fittings 14 to secure the fittings 14 through the bulkhead 12 to the front wall 54 of the closeout channel 52.

Additionally, a plurality of fasteners 76, secure the fittings 14 to seat track segments and the aircraft floor panel 16. It is to be understood that any conventional fastening means may be used. The forward stop fittings 14 act to distribute the load to the floor 16 and ultimately the shell 22 of the aircraft. The description above applies equally to each of the fittings 14, except the two outboard fittings 14 on each side have round holes, not slots.

As shown in FIG. 7, the bulkhead 12 is secured to the shell 22 by an attachment system 20. In one embodiment, the attachment system 20 includes a plurality of attachment fittings 80 located on the arcuate section 68 of the bulkhead. The plurality of attachment fittings 80 are attached to the upper arcuate portion 68 of the bulkhead 12. The attachment fittings 80 have a lower portion 84 that is secured to the front side 60 of the bulkhead 12 and an upper portion 86 that is attached to the arcuate portion 68 of bulkhead 12. The attachment system 20 also includes a plurality of stop fittings 82 which are attached to the fuselage shell 22 at locations adjacent to the attachment fittings 80. Each stop fitting 82 is attached to the shell 22 and spans two fuselage frames 23, to prevent forward movement of the bulkhead 12 and to disperse any crash loads into the fuselage shell 22 in the event of such a crash. The front surface 88 of the upper portion 86 of each of the attachment fittings 80 is in contact with a respective stop fitting 82. In the preferred embodiment shown, eighteen attachment fittings 80 and an equal number of stop fittings 82 are included, however, more or less may be used as necessary.

The aft-facing sides 90 of the upper portions 86 of the plurality of attachment fittings 80 are attached to short turnbuckle equipped aft restraint rods 92. The aft restraint rods 92 are attached at a first end 94 to the bulkhead 12 and at a second end 96 to the fuselage shell 22, at the rear of the bulkhead 12. These aft restraint rods 92 are adjusted to pre-load the bulkhead 12 against the forward stops 82 via the turnbuckle, to prevent rattling, and to react to aft decompression and inertia loads. Such turnbuckle operation is well known in the art.

In the embodiment shown, four aft restraint rods 92 are included. The four aft restraint rods 92 are attached to the four uppermost attachment fittings 80 to keep them out of the way of the cargo and personnel. It is to be understood that more or less aft restraint rods 92 may be included and that they can be attached to various attachment fittings 80.

The aft restraint rods 92 are preferably metal and rigid, however, they may alternatively be formed from fiberglass or another composite material. The aft restraint rods 92 also preferably span two fuselage frames 23. The aft restraint rods 92 are attached at their aft end 96 to an intercostal fitting 97 attached to the fuselage shell 22. The attachment holes 98 are preferably slotted so that the fuselage shell 22 can expand under normal cabin pressurization.

A plurality of retention members 100 are also included as part of the attachment system 20. The retention members 100 are attached at a first end 102 to the lower portion 84 of the attachment fitting 80 and at a second end 104 to the stop fitting 82 on the fuselage shell 22. In the embodiment shown, the eight retention members 100 are included and are attached to the top eight attachment fittings 80. The attachment system 20 shown also includes twenty restraint bolts 72 (as seen in FIG. 6) attached to the aircraft floor 16 to restrict the deflection of the fuselage shell 22 and floor 16 at the rigid cargo barrier. This will maintain the integrity of the attachment system of the bulkhead 12 to the shell 22 and floor 16, by preventing overriding of the stops 14 and 82. This ensures that the barrier 10 will continue to function and protect the crew, in the event crushable cargo expands outward and causes hydrostatic loading of the fuselage shell and floor. The restraint system has sufficient free travel to allow unrestricted expansion of the fuselage shell and floor during normal cabin pressurization, preventing induced fatigue loads in the fuselage.

All primary attachments 14, 82 of the barrier 10 to the aircraft are located forward of the barrier. This provides many advantages. Initially, because the attachments 14, 82 are not in a position to be contacted by the cargo, they will not be damaged by such cargo in the event of a crash. Conversely, attachments located to the rear of the barrier are subject to damage from the cargo in the event of a crash, resulting in possible premature failure of the attachments and thus the barrier.

Moreover, because the attachments 14, 82 are located forward of the bulkhead 12, there are no rods or straps in the cargo area to interfere with cargo handlers and maintenance personnel. This clutter may be a potential trip hazard and may constitute potential "headknockers."

Because the forward stop fittings 14 and 82 are compact and are located directly against the fuselage floor 16 and shell 22, they take up little space in the crew compartment 42 located forward of the rigid cargo barrier 10. Thus, the useful space gained by the rigid barrier of the present invention can be put to maximum 30 use. Additionally, the configuration of the forward stops 14 and 82 minimizes the modifications to the fuselage shell 22 and the floor structure 16 that are normally necessary when installing a cargo barrier.

The cargo barrier 10 is intended to be a permanent installation. When installing the barrier 10, the bulkhead is placed in the shell adjacent said fittings 14. The bulkhead 12 is then rotated upward around its bottom side. The fittings 80 are then secured to the bulkhead 12, once the bulkhead is raised past the point where fittings would contact one of the fuselage frames. The bulkhead 12 is then rotated to the upright position. The bulkhead 12 is then secured to the fittings 14 and the retention members 100 are also connected and the rods 92 are then attached via the turnbuckle, pre-tensioned such that the barrier 10 is installed in accordance with the above description.

The barrier installation design is additionally advantageous in that it is not limited to a single type of cargo aircraft and can be fitted into a variety of different aircrafts. For example, the rigid cargo barrier 10 of the present invention can be directly installed into any of the following McDonnell Douglas aircrafts: DC-10-10F; DC-10-30F; DC-10-40F; KC-10 and KDC-10 Tanker/Cargo; MD-11F Freighter; MD-11 Combi; and MD-11 CF Convertible Freighter. The design can also be adapted to various other manufacturer's aircraft.

While an embodiment of the invention has been illustrated and described, it is not intended that such disclosure illustrate and describe all possible forms of the invention. It is intended that the following claims cover all modifications and alternative designs, all equivalents, that fall within the scope of this invention.

What is claimed is:

1. A rigid cargo barrier for a cargo airplane having a floor and a fuselage shell defining an aft cargo hold, the barrier comprising:

a bulkhead having a forward face and an aft face, the bulkhead extending between the floor and a first portion of the fuselage shell forward of the cargo hold;

a plurality of first stop fittings located on the floor forward of the aft face of the bulkhead, wherein each first stop fitting abuttingly engages the bulkhead to prevent forward movement of the forward face of the bulkhead, and wherein the bulkhead is attached to each first stop fitting in a manner to provide for limited relative movement of the floor away from the bulkhead; and a plurality of second stop fittings affixed to the first portion of the fuselage shell forward of the aft face of the bulkhead, wherein each second stop fitting abuttingly engages the bulkhead to prevent forward movement of the bulkhead, and wherein the bulkhead is attached to each second stop fitting in a manner to provide for limited movement of the first portion of the fuselage shell away from the bulkhead.

2. The barrier of claim 1, further including a plurality of attachment fittings located along an upper portion of the bulkhead, and a plurality of retention members extending between the attachment fittings and the second stop fittings to limit relative movement of the second stop fittings away from the upper portion of the bulkhead.

3. The barrier of claim 2, further comprising at least one rod extending generally aftward between a respective one of the attachment fittings and the fuselage shell to forwardly bias the upper surface of the bulkhead against the second stop fittings.

4. The barrier of claim 1, wherein the bulkhead is of Grid-lock type construction.

5. The barrier of claim 6, further comprising a plurality of extension rods and a plurality of retention members securing the upper portion of the bulkhead to the fuselage.

6. A cargo barrier for a cargo airplane having a forward cabin, an aft cargo hold, a floor and a fuselage, the cargo barrier comprising:

a rigid bulkhead positioned in the airplane forward of the cargo hold and extending at least substantially between the floor and a first portion of the fuselage, the bulkhead having a base portion and an upper portion;

a plurality of first stop fittings on the floor securing the bulkhead to the floor such that the first stop fittings prevent relative forward movement of the bulkhead while providing for limited relative movement of the floor away from the base portion of the bulkhead;

a plurality of attachment fittings on the upper portion of the bulkhead;

a plurality of second stop fittings on the first portion of the fuselage, a respective one of the plurality of second stop fittings abuttingly engaging a respective one of the plurality of attachment fittings; and an access door formed in the bulkhead allowing crew to pass to and from the cargo hold;

wherein the plurality of first stop fittings and the plurality of second stop fittings are located forward of the bulkhead.

7. The barrier of claim 6, wherein the bulkhead is of Grid-lock type construction.

8. The barrier of claim 6, wherein the bulkhead is of Honeycomb type construction.

9. The barrier of claim 1, wherein one of the group consisting of each first stop fitting and the bulkhead includes a projection, and the other of the group consisting of each first stop fitting and the bulkhead includes a slot complementary to each projection, and wherein each projection moves within each complementary slot to provide for limited relative movement of the floor away from the bulkhead.

* * * * *